April 17, 1934.  G. A. MITCHELL ET AL  1,954,885
KINETOGRAPH MOVEMENT
Filed Aug. 7, 1929   3 Sheets-Sheet 1
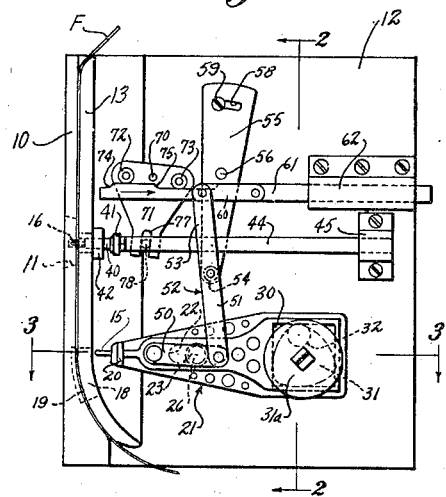
Fig. 1
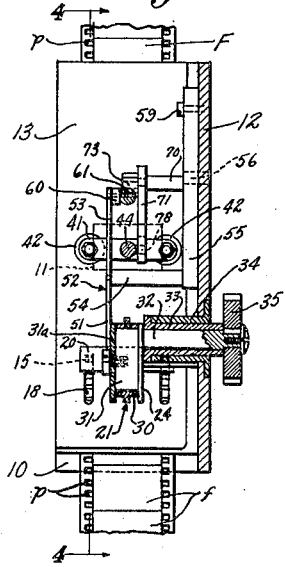
Fig. 2
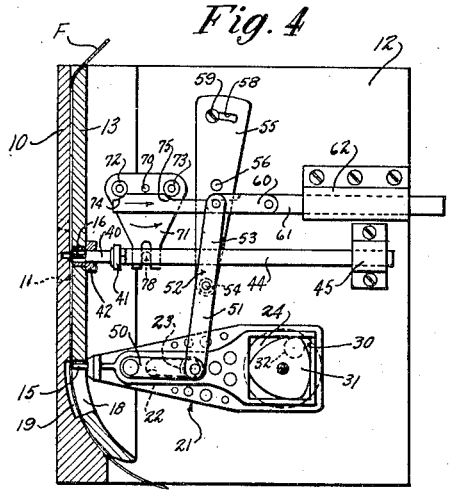
Fig. 4
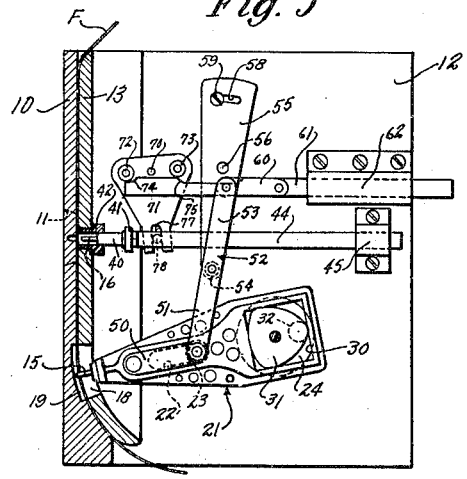
Fig. 5
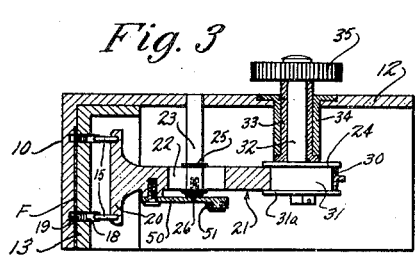
Fig. 3
*Inventors*
George A. Mitchell,
Edmund Lindgren.
*Attorney.*

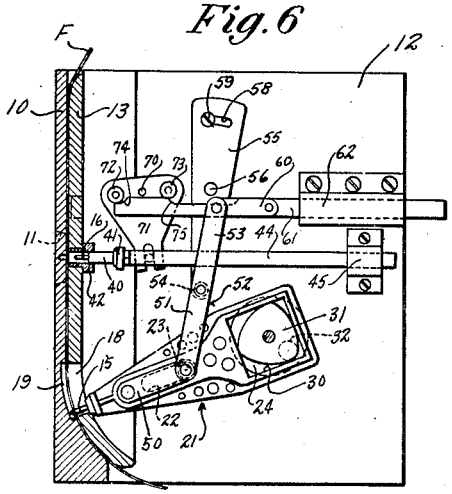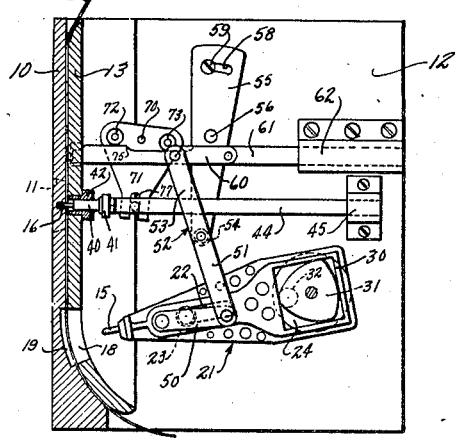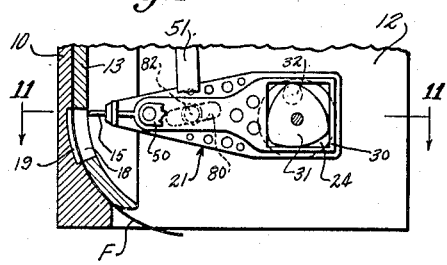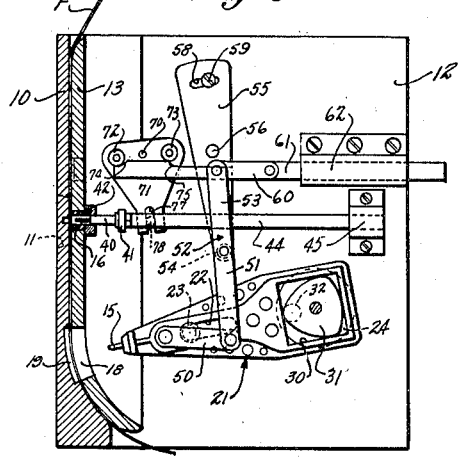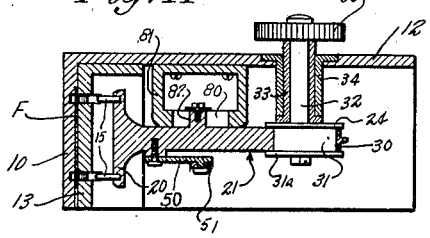
Inventors
George A. Mitchell,
Edmund Lindgren.
Attorney April 17, 1934.    G. A. MITCHELL ET AL    1,954,885
KINETOGRAPH MOVEMENT
Filed Aug. 7, 1929    3 Sheets-Sheet 3

Inventors
George A. Mitchell,
Edmund Lindgren.

Attorney.

Patented Apr. 17, 1934

1,954,885

UNITED STATES PATENT OFFICE 1,954,885

KINETOGRAPH MOVEMENT

George A. Mitchell and Edmund Lindgren, Los Angeles, Calif., assignors to Mitchell Camera Corporation, a corporation of Delaware Application August 7, 1929, Serial No. 384,013

14 Claims. (Cl. 88—18.4)

This invention relates generally to intermittent movement mechanisms, and more particularly to film movements for kinetographs and the like.

In the taking of motion pictures it is highly desirable for a number of reasons well understood in the art, that the intermittent film movement produce an intermittent motion of the film characterized in that the periods during which the film is moved are of short duration relative to the periods during which the film is stationary. The advantage of so designing the film movement resides, of course, mainly in that a longer time of exposure is permitted for any speed at which the camera may be operated, thus making possible work under poorer lighting conditions, at higher speeds, etc. In the designing of film movements it is always, therefore, a controlling object to produce a movement in which the periods of film movement are as short as possible relative to the stationary periods of the film, within the limits, of course, of a speed at which the film perforations would be sheared out.

It is therefore the primary object of the present invention to provide a film movement in which the film movement period is relatively smaller than has been usual, coupled with a design characterized by simplicity, effectiveness, smoothness of operation and durability.

It is a further object of the invention to provide means combined with a fast movement for operating film registering pilot pins.

Other features of the invention relate to a design and construction with a view toward freedom from noise making parts, which are particularly objectionable when the movement is installed in a camera utilized for taking sound pictures.

The invention will best be understood from the following detailed description of a present preferred embodiment thereof, reference for this purpose being had to the accompanying drawings, in which:

Figure 1 is a side elevation of the mechanism showing the parts in a position a few degrees before the film moving pins enter the film;

Fig. 2 is a vertical transverse section taken on line 2—2 of Fig. 1;

Fig. 3 is a horizontal section taken on line 3—3 of Fig. 1;

Fig. 4 is a section taken on line 4—4 of Fig. 2, and showing the parts in a position where the film moving pins are just entering the film;

Fig. 5 is a view similar to Fig. 4, but showing the parts in a position where the film moving pins are moving the film;

Fig. 6 is a view similar to Fig. 4, but showing the parts in a position just before the film moving pins leave the film;

Fig. 7 is a view similar to Fig. 4, but showing the pins in a position in the middle of their return movement;

Fig. 8 is a view similar to Fig. 7, but showing the parts in position to allow the film to be threaded through the device;

Fig. 10 is a fragmentary side elevation showing a modified form of the invention;

Fig. 11 is a horizontal section taken on line 11—11 of Fig. 10; and

Figure 9:
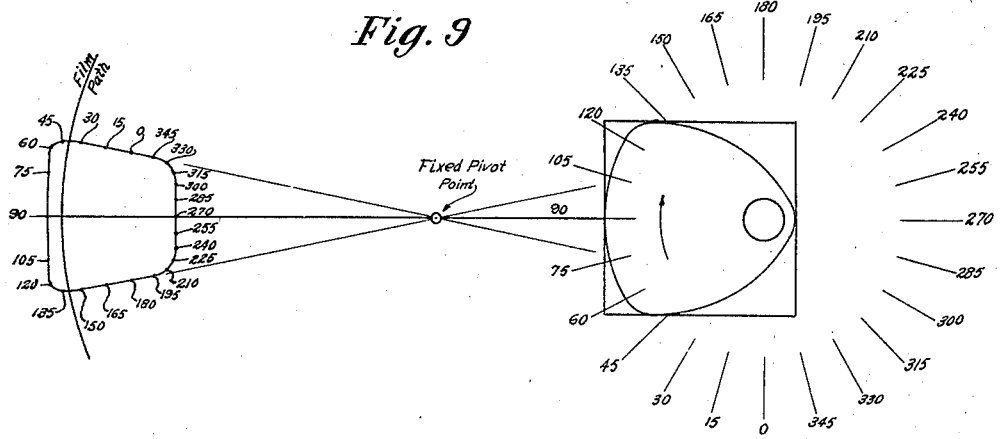
Fig. 9 is a diagram showing the path of the film moving pins for successive angular positions of the actuating cam.

The mechanism of the invention is adapted to be arranged in a case of any suitable design and construction and may be arranged to cooperate with suitable shutter mechanism and with a suitable arrangement of lenses, etc. For the sake of simplicity, however, the invention is herein set forth independent of any particular casing, shutter mechanism, arrangement of lenses, etc., it being apparent how the mechanism can be incorporated in a suitable design with such units.

Referring now to the drawings, the numeral 10 designates a vertical aperture plate having an exposure aperture indicated at 11, and the numeral 12 designates a vertical wall arranged at right angles to and extending rearwardly from one edge of aperture plate 10. Spaced rearwardly from aperture plate 10 and extending from wall 12 is a guide plate 13, between which and the aperture plate is slidably carried the film F, whose successive individual "frames" $f$ are intermittently registered, as hereinafter set forth, with aperture 11. The film guide way between the plate and guide plate is vertically disposed except at the lower portion thereof, where it is curved rearwardly to conform to the curvature of motion of the film moving means, now to be described. These parts comprise the fixed frame of the movement.

The film is intermittently advanced by means of film moving pins 15, which are operated to intermittently engage the film perforations P and draw the film downwardly (or upwardly) through a frame length in the usual manner. Pilot pins 16, actuated in synchronism with film moving pins 15, are operated to engage the film perforations P just before the film moving pins are withdrawn therefrom, and to withdraw from the film perforations just after the film moving pins again engage therewith, so that the film is always engaged by one or the other of the pairs of pins.

The film moving pins 15 are of proper size and are spaced so as to properly fit the perforations of the film, and are arranged to extend through vertical slots 18 and 19 in guide plate 13 and aperture plate 10, respectively. Pins 15 are carried at the ends of a cross-arm 20 arranged at the forward end of a swinging claw arm 21.

Arm 21 is provided intermediate its ends with a longitudinally extending guide slot 22 which slidably takes a pin 23 extending from wall 12 (see Fig. 3), pin 23 functioning as a support for arm 21 and as a pivot point about which arm 21 slidingly pivots during its operation, as will hereinafter be set forth. Pin 23 may be provided with a flange 25 bearing against the inner side of arm 21, and may have threaded into its outer end a screw 26 which holds a washer against the outer side of arm 21 for lateral support of said arm.

The rear end of arm 21 is provided with a box 30 within which works a cam 31, cam 31 being formed on the outer face of a flange 24 integral with drive shaft 32 (see Fig. 3). This cam may be described as having the outline of a circular triangle, the cam being formed by three major arcs struck from equidistant centers, joined by smaller arcs struck from the same centers. A washer 31a held against the outer face of cam 31 by means of a screw threaded thereinto confines the box of arm 21 in proper lateral position on cam 31.

Drive shaft 32 is journaled in an oilless bearing 33 removably carried in a bushing 34 extending through and supported in wall 12. The outer end of shaft 32 is provided adjacent the end of bearing 33 with a gear 35, which gear is adapted to mesh with another gear (not shown) by means of which shaft 32 and cam 31 are driven. Rotation of shaft 32 and cam 31 gives both longitudinal and lateral motion to arm 21, and causes the arm to oscillate and pivot with respect to pin 23, the film moving pins on the forward end of the arm describing the path illustrated in the diagram in Fig. 9.

In Fig. 9 the path of the film moving pins has been generated by rotating the cam through 360 degrees by 15 degree intervals and marking the successive points assumed by the end of the oscillating arm, the pivot point through which the arm passes remaining fixed. Fig. 1 of the drawings corresponds to the starting or zero degree position of the diagram, at which time the film moving pins are moving straight toward the film. In Fig. 4, at 40 degrees, the pins are just entering the film, and are still moving perpendicularly theretoward. Fig. 5 shows a midposition during the movement of the film by the pins, this figure being taken at 90 degrees. In Fig. 6 the pins are shown at 135 degrees, or just before leaving the film; and in Fig. 7 the pins are shown at 270 degrees, at which position they are midway in their return movement.

Attention is called to the fact that the pins are in engagement with the film during a period of less than 100 degrees of the rotation of the cam, thus leaving a period of more than 260 degrees for the film to remain stationary.

With a movement as fast as that provided by the present invention, great difficulty is involved in providing suitable film registering means for holding the film stationary while the film moving pins are removed from the film. Our present preferred film registering means is embodied as follows:

The film registering or pilot pins 16 are of a proper shape and spaced properly to fit nicely into the film perforations and register the successive film frames accurately with the exposure aperture 11 during the time the film moving pins are withdrawn from the film. Pins 16 are provided on and extend forwardly from cylindrical portions 40 carried at the opposite ends of a cross-arm 41, portions 40 having sliding bearing within bushings 42 extending through guide plate 13. Cross-arm 41 is carried on the forward end of a rod 44, the rear end of which is supported in a bearing 45 mounted on wall 12. An operative connection is then provided between the claw arm 21 and rod 44 so that the arm causes the pilot pins to enter the film just before the film moving pins are withdrawn therefrom, to withdraw from the film just after the film moving pins enter the film, and to remain substantially stationary at all other times.

This connection may be embodied as follows: Pivoted to arm 21 just forward of guide slot 22 is the forward end of a link 50, the rearward end of which is pivoted to the free end of the lower arm 51 of a lever 52. Lever 52 is pivotally mounted intermediate its end upon a post 54 extended from a carrier plate 55, which plate faces against the surface of wall 12 and is pivoted thereto at 56. Carrier plate 55 has a slot 58 circumferential relative to point 56, and through which passes a carrier plate clamping screw 59 threaded into wall 12. When screw 59 is loosened the carrier plate may be swung about point 56 a limited distance from its normal operating position for a purpose which will hereinafter be explained.

Pivoted to the free end of the upper arm 53 of lever 52 is the forward end of a link 60, which link is pivotally attached at its rearward end to a horizontal slide bar 61 supported in a bearing 62. By referring to Figs. 1, 4, 5, 6 and 7 it will be apparent how the previously described movement of arm 21 horizontally reciprocates bar 61 between its extreme operating positions, illustrated in Figs. 5 and 7.

In order to utilize this horizontal reciprocating motion of bar 61 for actuating the pilot pins 16 in proper synchronism with the operation of the film moving pins 15, the following provisions are made. Pivoted upon a post 70 extending outwardly from wall 12 is an oscillative member 71 having a pair of rollers 72 and 73 adapted to be contacted by a pair of respective cam surfaces 74 and 75 provided on the forward end of bar 61. It will be apparent how motion of the bar in one direction, say forward, causes cam surface 74 to raise its roller 72, while cam surface 75 allows its roller 73 simultaneously to lower, thus swinging member 71 to the left; while motion of the bar to the right similarly causes member 71 to swing to the right. The lower end of member 71 has a slot 77 in which is taken a pin 78 provided on rod 44 for horizontal movement thereof in accordance with the swinging of member 71.

In Fig. 1 the parts are shown in the zero degree position, in which the pilot pins are in engagement with the film and the film moving pins removed therefrom. In this position slide bar 61 is moving toward the right, but member 71 is stationary with the pilot pins controlled thereby in engagement with the film, the rollers of member 71 riding on horizontal parallel surfaces of the slide-bar. In Fig. 4 the film moving pins are just entering the film, and in this position the cam surfaces of bar 61 are acting to swing member 71 to the right, thereby withdrawing pins 16 from the film. In Fig. 5 the film moving pins are shown in a mid-position during movement of the film, the pilot pins being withdrawn therefrom. The parts are preferably so designed that during the movement of the film the pivotal connection of link 50 with lever arm 52 is directly in line with the pin 23 on which arm 21 is pivoting, with the result that during this phase of movement no motion is imparted to members 50, 52, 60, 71 and the pilot pins. In Fig. 6 the parts are shown just before the film moving pins leave the film and before bar 61 is moved to the left to swing member 71 in the same direction and thereby cause the pilot pins to enter the film. In Fig. 7 the film moving pins are withdrawn from the film and are moving through their return motion, while bar 61 has been moved to the left and in so doing has swung member 71 to the left, thus reinserting the pilot pins into the film perforations.

During the last phase of movement the pivotal connection of link 50 with the claw arm is nearly over or in line with pin 23, and the motion then imparted to pilot pin lever 52 and slide bar 61 is very small. Using the type of pilot mechanism here illustrated, it is not necessary that these parts be entirely motionless during this phase of the movement, for, as will be observed by reference to Fig. 7, straight surfaces of slide bar 61 are then in engagement with rollers 72 and 73 and therefore no movement of oscillative member 71 and the pilot pin rod 44 will then result from small movements of levers 52 and bar 61. In certain cases, however, for instance if a form of pilot pin connection not having this lost motion feature should be utilized, it will be apparent that by arranging the pivot connection between link 50 and the claw arm so that it will be exactly over pin 23 while the claw arm is pivoting through its return movement, the lever 52 will at this time also remain perfectly motionless. But with the present pilot pin connection it is sufficient that the pivot points referred to be simply nearly or substantially coaxial while the claw arm is moving through its return movement, that is, nearly enough so that the cam surfaces 74 and 75 will not be moved against rollers 72 and 73.

To thread the film through the movement, the mechanism is first stopped in a position in which the film moving pins are removed from the film, as in the position illustrated in Fig. 7. Clamping screw 59 is then loosened and carrier plate 55 swung to the position of Fig. 8. Lever 52, which is pivotally mounted on the lower end of carrier plate 55, is thereby swung rearwardly and accordingly moves bar 61 to the rear, which in turn actuates member 71 to withdraw the pilot pins from the film. The parts are then in the position illustrated in Fig. 8, with both the film moving and pilot pins entirely removed from the film.

Figure 12:
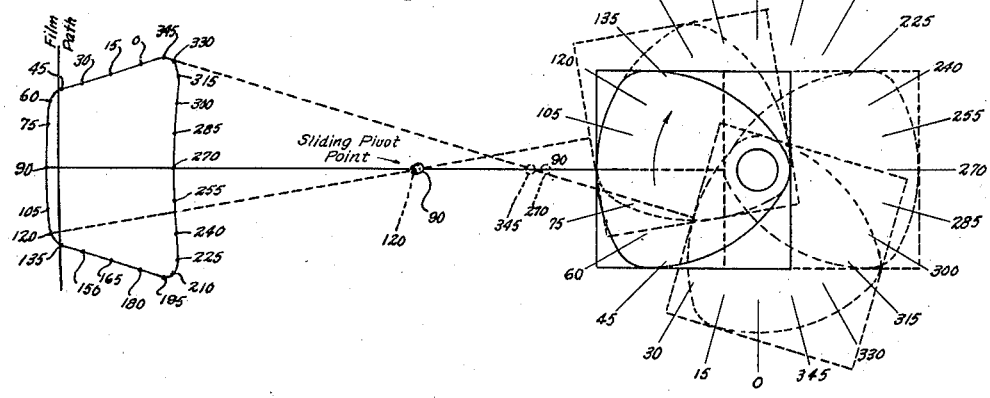
Fig. 12 is a diagram showing the path of the film moving pins for the embodiment of Figs. 10 and 11.

In Figs. 10 and 11 is shown a modified embodiment of the invention, which is similar to the above described preferred embodiment except that in place of providing a guide slot 22 in the arm and a fixed pin for said slot on wall 12, there is provided a guide slot 80 in a bracket member 81 supported from wall 12, and a pin 82 formed integral with the oscillating arm 21 slidably taken in the fixed guide slot. The path of the film moving pins according to this arrangement is diagrammed in Fig. 12. It will be seen from reference to that figure that the same fast movement is obtained, but that the pins are moved through a longer path outside of the film than before.

In both cases, however, it will be recognized that the claw arm is provided intermediate its ends with a sliding pivotal connection with the fixed frame of the movement. In fact, the sliding pivotal connection can be of any mechanical form, but for simplicity's sake the forms here shown, involving a simple pivot pin and guiding groove, are preferred.

It will be understood the drawings and description are to be considered merely as illustrative of and not restrictive on the broader claims appended hereto, for various changes in design, structure and arrangement may be made without departing from the spirit and scope of said claims.

We claim:—

1. In a film movement, the combination of a frame providing a film guide way, a claw arm having at its forward end film moving pins adapted to engage and move a film in the guide way, a cam operating on the rear end of the claw arm to give both longitudinal and lateral motion thereto, means providing a sliding pivotal mounting for the claw arm on the frame at a point intermediate the ends of said arm, and means operable intermittently to hold the film against movement, said means including a member mounted to reciprocate towards and away from the film, a pilot pin on said reciprocating member adapted to engage the film, an oscillative member pivoted to the frame and having operative connection with said reciprocating member, a slide member mounted to reciprocate relative to said oscillative member, means operatively connecting said claw arm with said slide member, and cam means on said slide member adapted by actuation of said claw arm and connecting means to operate said oscillative member to cause the pilot pin to alternately engage and disengage the film.

2. In a film movement, the combination of a frame providing a film guide way, a claw arm having at its forward end film moving pins adapted to engage and move a film in the guide way, a cam operating on the rear end of the claw arm to give both longitudinal and lateral motion thereto, means providing a sliding pivotal mounting for the arm on the frame at a point intermediate the ends of said arm, and means operable intermittently to hold the film against movement, said means including a member mounted to reciprocate towards and away from the film, a pilot pin on said reciprocating member adapted to engage the film, an oscillative member pivoted to the frame and having operative connection with said reciprocating member, a slide member mounted to reciprocate relative to said oscillative member, a lever pivoted intermediate its ends relative to the frame and linked at one end to the claw arm and at the other end to the slide member, and cam means on said slide member adapted by actuation of said claw arm and lever to operate said oscillative member whereby the pilot pin is caused to alternately engage and disengage the film.

3. In a film movement, the combination of a frame providing a film guide way, a claw arm mounted to move pivotally and longitudinally, actuating means adapted to give alternating longitudinal and pivotal swinging movements to the claw arm, a pilot pin for intermittently holding the film, a pilot pin actuating lever, a link connecting said lever with the claw arm, said link having a pivotal connection with said lever, which pivotal connection is substantially coaxial with the swinging pivotal point of the claw arm when the claw arm is being swung on its pivotal point by the actuating means.

4. In a film movement embodying a frame providing a film guide way, the combination with an oscillative film moving claw arm adapted to intermittently move a film in the guide way, of means operable intermittently to hold the film against movement, said means including a member mounted to reciprocate toward and away from the film, a pilot pin on said reciprocating member adapted to engage the film, an oscillative member pivoted to the frame and having operative connection with said reciprocating member, a slide member mounted to reciprocate relative to said oscillative member, means operatively connecting said claw arm with said slide member, and cam means on said slide member adapted by actuation of said claw arm and connecting means to operate said oscillative member to cause the pilot pin to alternately engage and disengage the film.

5. In a film movement embodying a frame providing a film guide way, the combination with an oscillative film moving claw arm adapted to intermittently move a film in the guide way, of means operable intermittently to hold the film against movement, said means including a member mounted to reciprocate toward and away from the film, a pilot pin on said reciprocating member adapted to engage the film, an oscillative member pivoted to the frame and having operative connection with said reciprocating member, a slide member mounted to reciprocate relative to said oscillative member, a lever pivoted intermediate its ends relative to the frame and linked at one end to the claw arm and at the other end to the slide member, and cam means on said slide member adapted by actuation of said claw arm and lever to operate said oscillative member whereby the pilot pin is caused to alternately engage and disengage the film.

6. In a film movement embodying a frame providing a film guide way, the combination with an oscillative film moving claw arm adapted to intermittently move a film in the guide way, of means operable intermittently to hold the film against movement, said means including a member mounted to reciprocate relative to the film, a pilot pin on said reciprocating member adapted to engage the film, an oscillative member pivoted to the frame and having operative connection with said reciprocating member, means actuated by said claw arm to swing said oscillative member to cause the pilot pin to alternately engage and disengage the film, and means for manually setting said last mentioned means in such a manner that the oscillative member causes the pilot pins to be disengaged from the film at a time when the claw arm is disengaged from the film.

7. In a film movement embodying a frame providing a film guide way, the combination with an oscillative film moving claw arm adapted to intermittently move a film in the guide way, of means operable intermittently to hold the film against movement, said means including a member mounted to reciprocate relative to the film, a pilot pin on said reciprocating member adapted to engage the film, an oscillative member pivoted to the frame and having operative connection with said reciprocating member, a slide member mounted to reciprocate relative to said oscillative member, a carrier shiftably mounted in the frame, means operatively connecting said claw arm with said slide member supported on said carrier, and cam means on said slide member adapted by actuations of said claw arm and connecting means when the carrier is in operative position, to operate the said oscillative member to cause the pilot pin alternately to engage and disengage the film, and further adapted to be actuated by shifting of the carrier from its normal operative position to operate said oscillative member to hold the pilot pin out of engagement with the film while the claw arm is out of engagement with the film.

8. In a film movement embodying a frame providing a film guide way, the combination with an oscillative film moving claw arm adapted to intermittently move a film in the guide way, of means operable intermittently to hold the film against movement, said means including a member mounted to reciprocate relative to the film, a pilot pin on said reciprocating member adapted to engage the film, an oscillative member pivoted to the frame and having operative connection with said reciprocating member, a slide member mounted to reciprocate relative to said oscillative member, a carrier movable in the frame, a lever pivoted intermediate its ends on the carrier and linked at one end to the claw arm and at the other end to the slide member, and cam means on the slide member adapted by actuation of the claw arm and lever when the carrier is in operative position, to operate said oscillative member to cause the pilot pin alternately to engage the film, and to be actuated by movement of said lever when the supporting carrier thereof is shifted from its normal operative position to operate said oscillative member to hold the pilot pin out of engagement with the film while the claw arm is out of engagement with the film.

9. Film holding mechanism embodying a frame providing a film guide way, a member mounted to reciprocate towards and away from a film in the guide way, a pilot pin on said reciprocating member adapted to engage the film, an oscillative member pivoted to the frame and having operative connection with said reciprocating member, a slide member mounted to reciprocate relative to said oscillative member, cam means on the slide member adapted to operate the oscillative member to cause the pilot pin alternately to engage and disengage the film when the slide member is slided back and forth, and means to slide the slide member.

10. In a film movement, the combination of a frame providing a film guide way, a claw arm, a fixed pivot on which the claw arm slides longitudinally and swings, actuating means adapted to give alternating longitudinal and pivotal swinging movements to the claw arm, a pilot pin for intermittently holding the film, a pilot pin actuating lever, and a link connecting said lever with the claw arm, said link having a pivotal connection with said lever, which pivotal connection is substantially coaxial with the claw arm pivot when the claw arm is being swung on its pivot by the actuating means.

11. In a film movement, the combination of a frame providing a film guide way, a claw arm mounted to move pivotally and longitudinally, means adapted to give alternating longitudinal and pivotal swinging movements to the claw arm, a pilot pin for intermittently holding the film, and an interconnection between said pilot pin and said claw arm, said interconnection including a link having two pivotal connections, one of said connections being substantially coaxial with the swinging pivot point of the claw arm during swinging of the claw arm on its pivotal point so that said connection is substantially stationary during such time.

12. In a film movement, the combination of a frame providing a film guide way, a claw arm mounted to move pivotally and longitudinally, means adapted to give alternating longitudinal and pivotal swinging movements to the claw arm, a pilot pin for intermittently holding the film, and an interconnection between said pilot pin and said claw arm, said interconnection including a link having two pivotal connections, one of which is with the claw arm, and one of said pivotal connections being substantially coaxial with the swinging pivot point of the claw arm during swinging of the claw arm on its pivotal point so that said connection is substantially stationary during such time.

13. In a film movement, the combination of a frame providing a film guide way, a claw arm mounted to move pivotally and longitudinally, means adapted to give alternating longitudinal and pivotal swinging movements to the claw arm, a pilot pin for intermittently holding the film, and an interconnection between said pilot pin and said claw arm, said interconnection including a link having two pivotal connections, one of which is substantially coaxial with the swinging pivot point of the claw arm during swinging of the claw arm on its pivot, so that said connection is substantially stationary during such time, and the other of which is to the claw arm at a point moving about said pivot as a center.

14. In a film movement, the combination of a frame providing a film guideway, a claw arm mechanism adapted intermittently to move a film in the guideway, said mechanism involving an oscillating arm having longitudinal and pivotal swinging movements, a pilot pin for intermittently holding the film, and an interconnection between said pilot pin and said oscillating arm, said interconnection including a link having two pivotal connections, one of said connections being substantially coaxial with the swinging pivot point of the oscillating arm during swinging of said arm on its pivot, so that said connection is substantially stationary during such time.

GEORGE A. MITCHELL.
EDMUND LINDGREN.